United States Patent [19]

Brindle

[11] 4,347,027
[45] Aug. 31, 1982

[54] DRILL SCREW

[75] Inventor: Brian Brindle, Glen Waverley, Australia

[73] Assignee: Illinois Tool Works Inc., Chicago, Ill.

[21] Appl. No.: 821,365

[22] Filed: Aug. 3, 1977

Related U.S. Application Data

[63] Continuation of Ser. No. 671,454, Mar. 29, 1976, abandoned.

[51] Int. Cl.³ ............................................. F16B 25/00
[52] U.S. Cl. ..................................... 411/387; 408/224
[58] Field of Search ............... 85/41, 43, 47; 408/224, 408/225, 226, 230; 411/387

[56] References Cited

U.S. PATENT DOCUMENTS 2,468,874  5/1949  Hawkins ............................ 408/226
3,045,523  7/1962  Reed ...................................... 85/47
3,358,548 12/1967  Dyslin .................................... 85/47
3,699,841 10/1972  Lanius .................................... 85/41
3,869,219  3/1975  Wilson et al. ...................... 85/47 X
3,982,464  9/1976  Sygnator ................................ 85/47

Primary Examiner—Thomas J. Holko
Attorney, Agent, or Firm—Thomas W. Buckman; Robert W. Beart

[57] ABSTRACT

A drilling and reaming screw is disclosed having a drill tip and a pair of frangible wings as a reaming means. The frangible wings are formed from the shank so that they include inner portions within the shank diameter and outer portions outside the shank diameter. Upon reaching a workpiece of predetermined hardness, the outer portions are adapted to break off from the shank along a line lying entirely beneath the surface of the shank such that no harmful protuberances remain.

1 Claim, 12 Drawing Figures

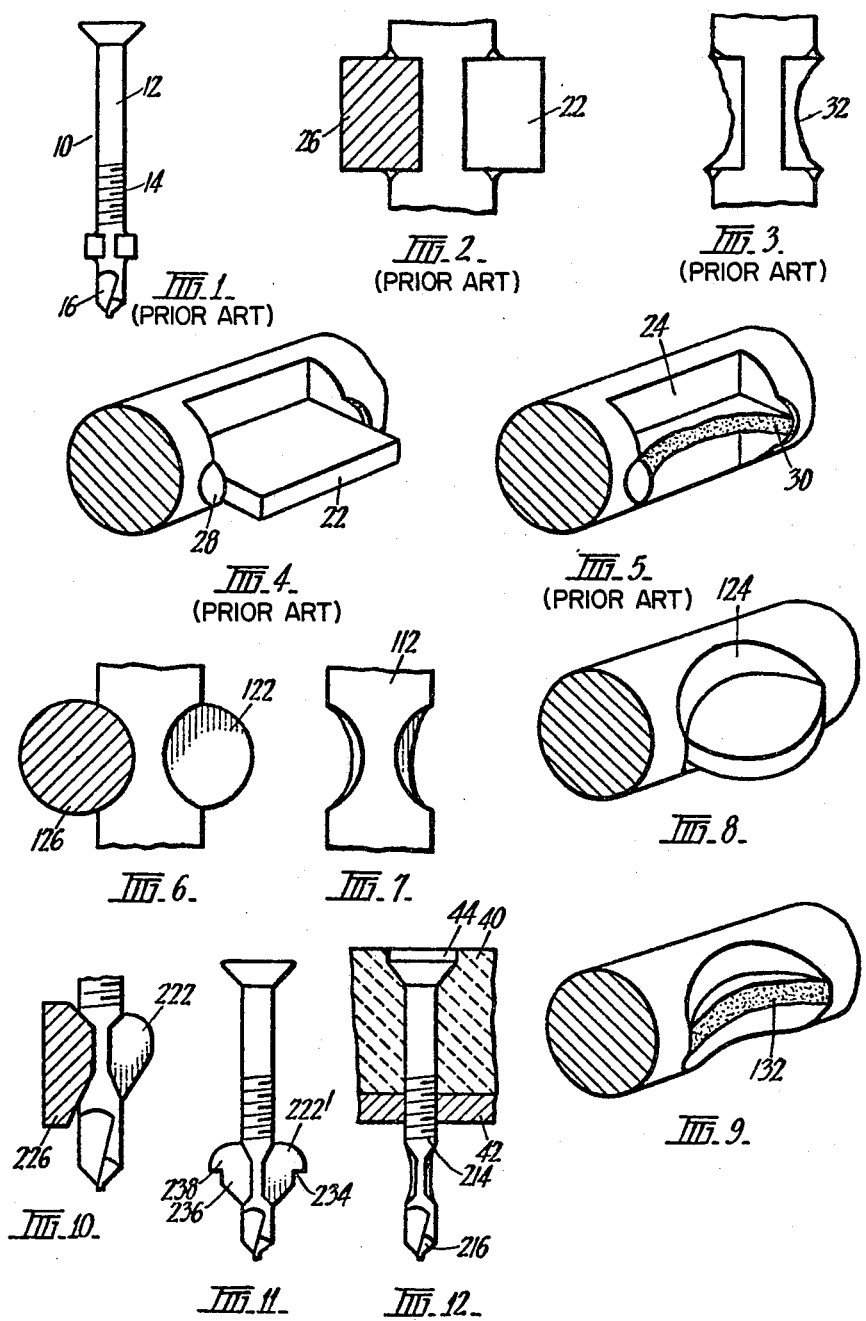

1

DRILL SCREW

This is a continuation, of application Ser. No. 671,454, filed Mar. 29, 1976, now abandoned.

This invention relates to improvements in and relating to drill screws of the type described generally in U.S. Pat. No. 3,358,548 of R. H. Dyslin—that is to say, to screws having laterally extending ears or wings for enlarging a hole formed by the screw in one object and which are made to break off when the screw has entered a second object. The invention refers particularly to the manufacture of such screws.

The tools used in the manufacture of such screws, for the formation of the lateral ears or wings (hereinafter referred to as wings), are generally rectangular in profile and have a limited life due to chipping of the corners of the tools caused by the high stresses associated with those sharp corners. Also, the rectangular tools can cause build-up of the wing adjacent the screw shank, such build-up acting as a strengthening rib in the edge of the wing and requiring increased force to break off the wing. Further, this build-up causes the wings to countersink the material being drilled and tapped, thus reducing the strength of the fastening by reducing the number of threads tapped. Additionally, the wings tend to fracture at a location outside the shank of the screw and the resultant rough edge tends to ream the drilled hole and so reduce the depth of thread formed by the screw, reducing the strength of the fastening.

It is the principal object of this invention to provide improvements in the manufacture of these winged drill screws devised for the purpose of eliminating the disadvantages set out above.

According to this invention the punch tools for the production of the wings in winged drill screws of the type described do not have sharp corners at their extremities so as to reduce the tendency to build-up at the locations where the wings join the shanks. The punch tools may be circular in section, to provide a semi-circular indentation in the screw shank; or elliptical in cross-section; or of hexagonal shape with a short inner edge, an outer edge parallel thereto, front and rear ends at right angles to the outer edge and inclined edges joining the inner extremities of the front and rear ends and the short inner edge; or similar to the latter but with arcuate edges joining the front and rear ends to the short inner edge, or of other satisfactory shape.

In order that the invention may be clearly understood and readily put into practical effect there shall now be described some preferred forms of drill screws according to the present invention, the description being by way of example only and with reference to the accompanying illustrative drawings. In the drawings:

FIG. 1 is an elevation of the screw of the aforementioned patent;

FIG. 2 is a schematic elevational view showing the screw of FIG. 1 with one tool still in place;

FIG. 3 is a schematic elevational view corresponding to FIG. 2 showing the screw after the wings have been fractured;

FIG. 4 is a schematic perspective view of the screw of FIGS. 1 and 2 showing a wing prior to fracture;

FIG. 5 is the screw of FIG. 4 after fracture of the wing;

FIG. 6 is a schematic elevational view of a screw of the present invention with one tool still in place;

FIG. 7 is a schematic elevational view corresponding to FIG. 6 showing the screw after the wings have been fractured;

FIG. 8 is a schematic perspective view of the screw of FIG. 6 showing one wing prior to fracture;

FIG. 9 is the screw of FIG. 8 after the fracture of the wing;

FIG. 10 is a schematic elevational view of a second screw of the present invention with one tool still in place;

FIG. 11 is an elevation of a third screw of the present invention; and

FIG. 12 is a schematic elevation showing the screw of FIGS. 10 and 11 after use.

Referring now to FIGS. 1 to 5, the prior art screw 10 shown has a shank 12 having threads 14 along a substantial portion of its extent, a tip 16 at its entering end and a head 18 provided with suitable driving means (not shown) at the opposite end. The tip 16 in the embodiment disclosed is provided with drilling flutes of the type disclosed in U.S. Pat. No. 3,125,923, but for purposes of the present invention drill points of other configurations can be used with equal facility. Similarly, the threaded portion 14 of shank 12 may have a slot providing a cutting edge in the entering portions of the threaded section 14 for purposes of cutting threads in a workpiece.

Intermediate the tip 16 and the threaded portion 14 of the shank 12 there is provided a pair of ears 22 which are struck from the parent material of shank 12 by any suitable means such as pinch pointing, which is well known in the art. This is generally accomplished by exerting pressure by dies 26 transverse to the axis of the screw and forcing material from the shank to be extruded laterally resulting in slots 24 where material has been removed to form the laterally extending ear 22. The ear 22 extends outwardly from the shank 12 a radial distance equal to or greater than the major diameter of the threaded portion 14. In some instances, however, this radial dimension can be limited to a point where it is less than the major diameter but greater than the pitch diameter of the threads on said shank. Ears 22 are so dimensioned as to control their physical strength.

As a result of the forcing of the material from shank 12 by die 26 to form ear 22, it has been found in practice that a build-up of material 28 occurs at each longitudinal end of the ear 22 at the junction thereof with shank 12. This means that when the ears 22 are broken off in use, dags 30 remain where the build-ups 28 were before fracture. These dags 30 project radially beyond the outer surface of shank 12 and hence act as counter-boring tools. This naturally, decreases the effectiveness of the operation of the screw 10 as the remaining material in a panel into which the threaded portion 14 is to engage is significantly less than the depth of the threads and hence the security of the fastening is diminished. The curved shape of the fracture line 32 is due to the inherent strength of the material.

To refer now to FIGS. 6 to 9, there is shown a screw according to the present invention. Like parts are given like reference numerals with the addition of the prefix number 1. Here, the shank 112 has two diametrically opposed semi-circular slots 124 and ears 122 of approximate circular shape and which are formed by circular dies 126. As can be seen, it has been found that with the circular shape of ears 122 there is no or very little build-up at the junction of ears 122 with the outer surface of shank 112 and that, in consequence, the fracture line 132 does not extend beyond the outer surface of shank 112 to form dags. In this way the performance of the screw is greatly improved. Furthermore, as they have no sharp corners, the dies 126 have a far greater life expectency.

Referring now to FIGS. 10 and 11 there is shown a second screw according to the present invention and where, again, like parts are given like reference numerals with the addition of the prefix number 2. The screw shown here is used to provide a countersink for the head of the screw rather than a counterbore to allow free passage for the threaded portion.

Here, the shank 212 has two diametrally opposed ears 222 formed by dies 226. The slots (not shown) each having a side substantially parallel to the axis of the shank 212, a forwardly and outwardly extending side at a relatively shallow angle to the axis of the shank 212— less than 45° and preferably about 30°—and a rearwardly and outwardly extending side of a greater angle to the axis of the shank-as at about 45°, or between 30° and 60°. The ears 222 extending from the shank 212 have rear edges substantially normal to the line of the shank 212, front edges extending at a shallow angle to the line of the shank 212—as, for example, at about 30° or even less—and an outer side curved for the major part. This form of ear 222 will form a countersink so as to accommodate the head of the screw before they are made to break-away.

The screw of FIG. 11 is the same as that of FIG. 10 except that a notch 234 is provided in the front edge of each ear 222'. In this way each ear 222 is divided into a front portion 236 which countersinks and recesses the hole and a second portion 238 of enlarged radial dimensions which contacts the material surrounding the countersunk and recesses hole to cause both ears 222' to break-away.

The operation of the embodiment of FIG. 11 is shown in FIG. 12 where the screw is used to fasten two superposed panels 40 and 42 of dissimilar materials. The first panel or work member 40 is softer than the second work member or panel 42. As the screw is applied by axial pressure from the head and rotated the tip 216 will create its own bore through panel 40 with the portion 236 of ears 222' acting as countersinkers to enlarge the diameter of the bore to form a countersunk recess 44. When the countersunk recess 44 has been formed, second portion 238 will contact upper surface of panel 40 to cause ears 222' to be broken-away.

It is believed that the screws provided by this invention will be a marked improvement over the known winged drill screws and will gain an ever greater acceptance in industry and commerce.

Modifications in details of construction and design may be made without departing from the ambit of the invention, the nature of which is to be ascertained from the following claims.

I claim:
1. A drilling and reaming screw for use in fastening two or more juxtaposed workpieces, said screw comprising a drill tip, a shank having a surface defining a first radius, a head, a screw thread on a portion of the length of the shank, and two or more frangible reaming means projecting from a region of the shank intermediate the tip and the thread and pinched from the shank material, said projecting reaming means being integral with the shank and each including an inner and an outer portion, said inner portion extending radially inwardly from the shank surface to a juncture line which includes upper and lower segments, each segment intersecting the shank surface at an acute angle thereto, said outer portion extending radially beyond the shank surface to a radius at least as great as the crest radius of the thread being thereby operative in workpieces made of materials of less than a predetermined hardness to form a hole having a radius at least as great as the crest radius of the thread, but being so weakly connected to the shank that the reaming means will be broken and separated from the shank in workpieces formed of materials of more than the predetermined hardness, said separation occurring along a line lying entirely beneath the surface of the shank such that no harmful protuberances remain.

* * * * *